May 20, 1947.　　　　D. R. ZUCK　　　　2,420,764
DIRECTIONAL PROPELLER CONTROL
Filed Sept. 21, 1943　　　3 Sheets-Sheet 1

INVENTOR.
DANIEL R. ZUCK,
BY
ATTORNEY.

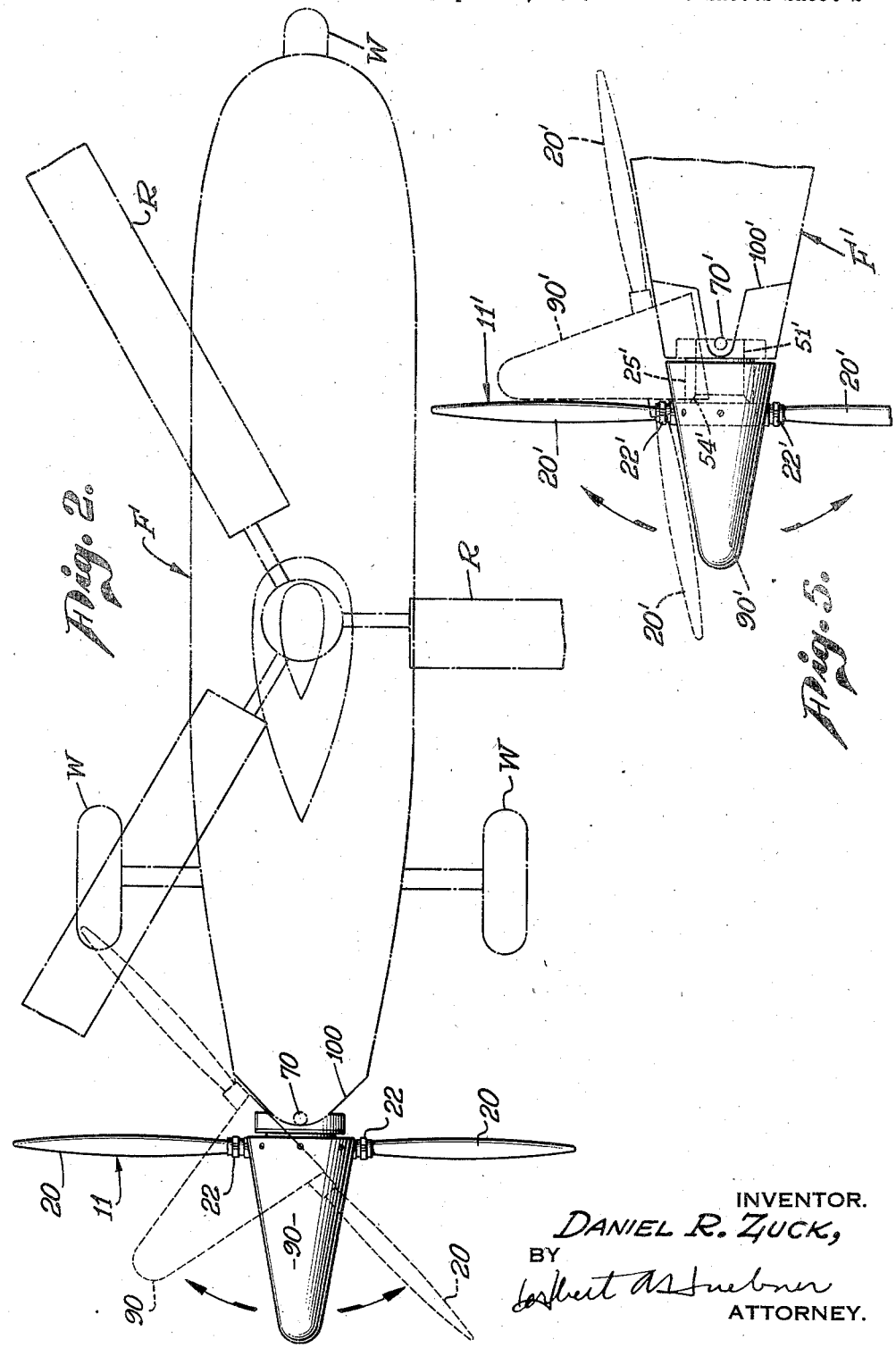

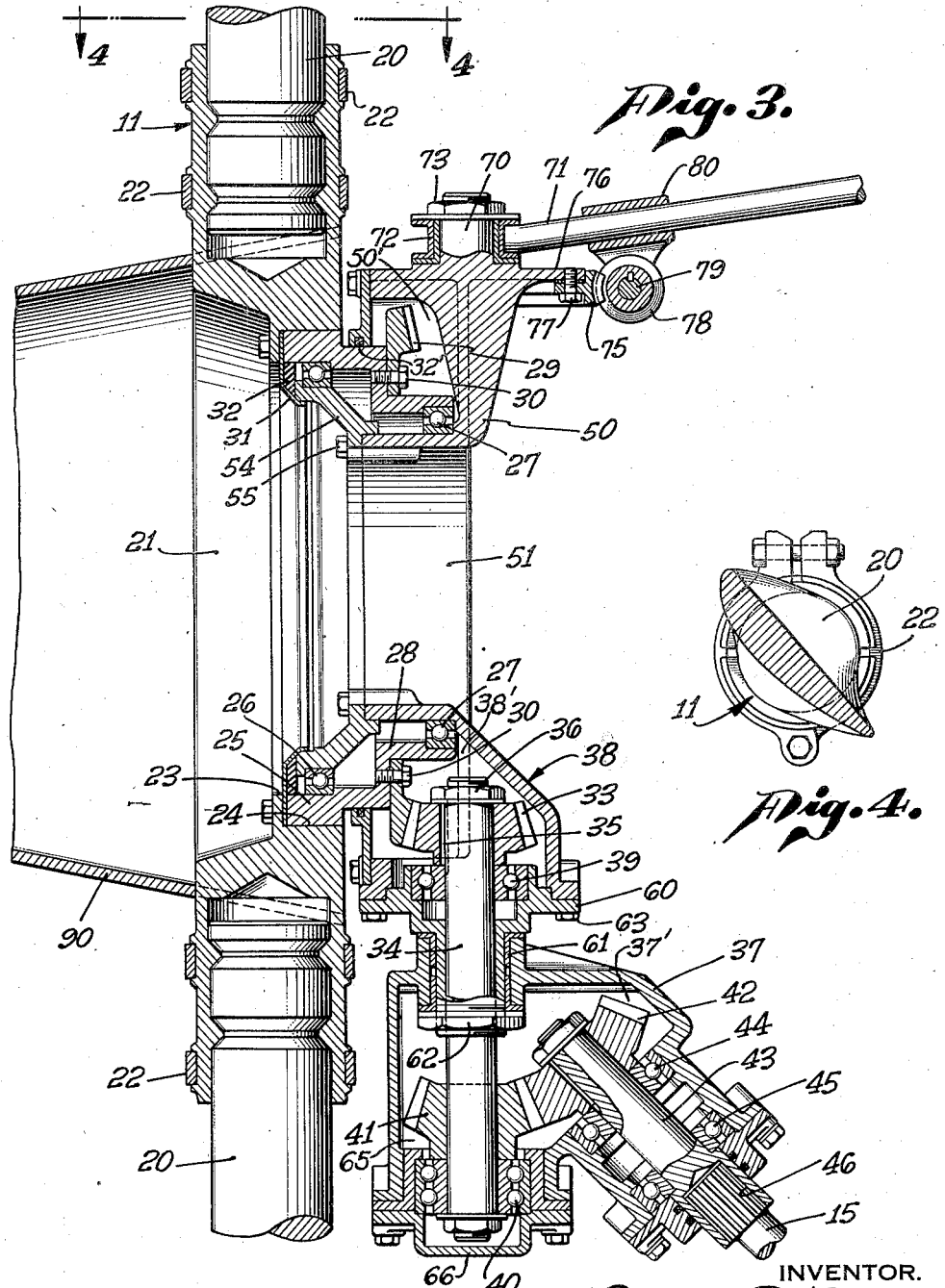

Patented May 20, 1947

2,420,764

UNITED STATES PATENT OFFICE 2,420,764

DIRECTIONAL PROPELLER CONTROL

Daniel R. Zuck, Los Angeles, Calif.

Application September 21, 1943, Serial No. 503,221

6 Claims. (Cl. 244—51)

1

My invention relates to propeller directional control of aircraft.

Propellers in aircraft of all types with which I am familiar are mounted on hubs with fixed axis which are in most cases parallel to the longitudinal axis of the fuselage or cabin. In conventional airplanes drift is offset by trimming the rudder. In the case of helicopters, in which the horizontal rotor exerts a torque around the vertical axis of the craft, various expedients have been tried for offsetting such torque to keep the craft pointed in a given line of flight. Auxiliary planes or stationary vanes have been tried without satisfactory result. Another method was to utilize tail or side propellers mounted on fixed axis laterally of the ship, which method was modified to provide for "rudder" control by varying the pitch of such propellers. This proved to be too complicated. A further development was to employ cyclic pitch control of the main rotor, by which the pitch of the rotor blades automatically changes through each revolution, so that one side lifts more than the other and consequently "banks" the ship for turning right or left. Whether this directional control can be employed to keep the ship on a straight line is not certain. A somewhat similar problem of rudder control occurs in autogiros, for although they are propelled by conventional propellers and controlled by rudders, the air turned rotor is thought to exert some undesired torque action on the fuselage.

An object of my invention is to provide directional control for aircraft by varying the axis of the propeller. In conventional airplanes such control may be used to offset drift. In helicopters and Autogiros the control may offset torque and function as a rudder. The same features are applicable to non-rigid aircraft.

Another object of my invention is to provide a combination of propeller directional control and propulsion means for helicopters. Present helicopter designs provide for propulsion by inclining the lifting rotor to attain thrust. The disadvantages of power loss by this means prevent attainment of high speeds. By the use of my propeller control, the propeller may be directed to exert forward thrust as well as offset rotor torque, and high speeds may be thus obtained.

A further object of my invention is to provide a novel form of propeller mount whereby the axis may be varied at will without interfering with the delivery of rotative power. While I do not illustrate such a modification, it will be apparent that a pitch control may be incorporated if de-

2 sired, as there is ample room in the hub of my device for installing known types of pitch control.

A more specific object of the invention is to provide a swivel propeller assembly which may be controlled by the pilot.

The primary features of my propeller control in combination with a gun mount were disclosed in my copending application Serial No. 442,292, filed May 9, 1942, in which division was required between claims to an airplane gun mount and claims to an adjustable propeller assembly for airplanes. The present application is a continuation in part of said copending application.

Further objects and advantages will become more apparent from a consideration of the drawings and detailed description which follow.

In the drawings:

Figure 2 is a top plan view of the same.

Figure 3 is an enlarged cross sectional view showing the details of the swivel mounting of the propeller.

Figure 4 is a cross section of the propeller taken on the line 4—4 of Figure 3.

Figure 5 is a fragmentary elevational view of the tail section showing a modified form of the invention.

Figure 1:
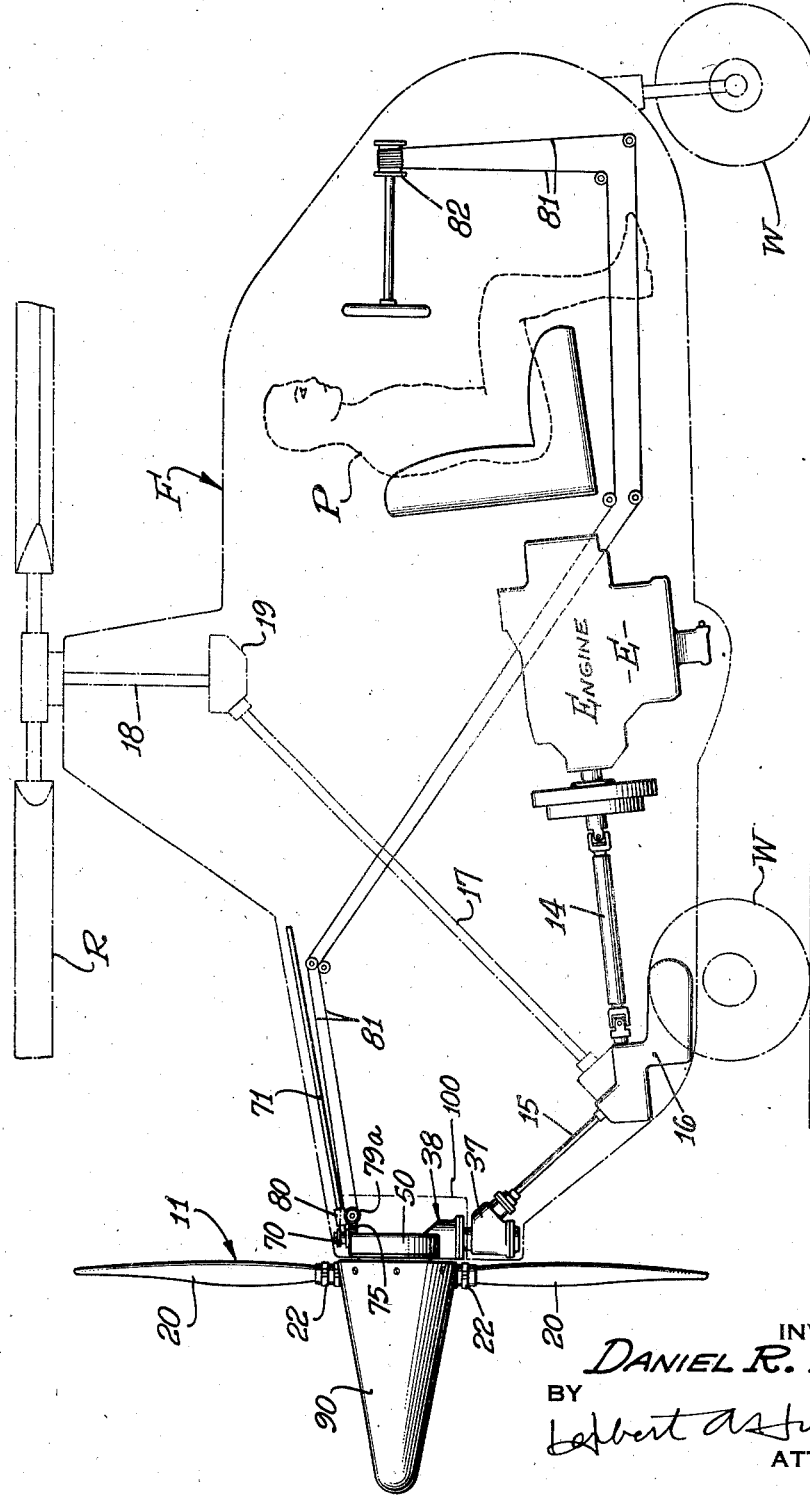
Figure 1 is a side elevational view of an aircraft incorporating my invention.

One form of airplane in which my invention may be embodied is shown in Figures 1 and 2, being a roadable helicopter comprising a fuselage F, lifting rotor R, road wheels W, and engine E. Any suitable drive between engine and rotor may be employed, or a different engine may be used for the rotor. As far as my invention is concerned, the craft may be an Autogiro, with the rotor merely turned by movement through the air, or the craft may be any other type of aircraft.

A propeller 11 is in this instance shown mounted as a pusher type, but the invention is applicable as well to nose or wing installation. The engine E is shown as operatively connected to the propeller by means of shafts 14 and 15 and gear box 16, through gears subsequently described in detail. This provides an arrangement by which the road wheels may be driven by any suitable power take-off from the gear box 16, but may be modified according to the design of the craft. Lifting rotor R may be operated from gear box 16 through shafts 17 and 18, and gear box 19.

The propeller 11 comprises one or more propeller blades 20 mounted on a circular hub 21 by means of a standard clamp 22. The hub 21 is formed as a ring with a hole 23, and a relatively larger opening or annular wall 24 formed for bolting the hub onto a bearing member 25. The bearing member 25 rides on ball bearings 26 and 27 and is formed with an offset flanged portion 28 to which a ring gear 29 is secured by means of bolts 30. Proper lubrication may be retained in the bearings 26 and 27 by means of a grease retaining ring 31 and a grease retaining felt 32. An annular sealing ring 32' is likewise provided on the outside of the bearing member.

The ring gear 29 meshes with a pinion gear 33. The pinion gear 33 is mounted on pinion shaft 34 by means of a key 35 and nut 36.

The pinion shaft 34 is disposed within a chamber 37' of a stationary gear housing 37 and a chamber 38' of a swivel housing 38 (to be explained later) and runs in bearings 39 and 40. A bevel gear 41 is keyed to the shaft 34 and meshes with a corresponding bevel gear 42. The gear 42 is keyed to a spline shaft 43. The spline shaft 43 is mounted in the stationary housing 37 by any suitable bearings 44 and 45 and is coupled to the power shaft 15 by means of a spline fitting 46. A lower portion 65 of the chamber in the stationary housing is closed by a cap 66.

Thus it will be seen that the power of the engine E is delivered to the propeller 11 by means of drive shaft 14 coupled to power shaft 15 by means of gear box 16, through the gears and shafts within the housings 37 and 38.

The gear box 16 may be provided with any suitable form of power takeoff for transmitting power to the roadwheels W when the airplane is on the ground. The power to the propeller and roadwheels may be delivered selectively or simultaneously.

The entire propeller assembly is so mounted that it may be swiveled horizontally on a vertical axis, it being for such purpose mounted on the swivel housing 38. The swivel housing 38 comprises a shell 50 formed with a central sleeve 51 and incorporates a substantially annular chamber 50'. A bearing race member 54 is fastened to sleeve 51 of shell 50 by means of bolts 55 and adapted to fit within the grease retaining ring 31.

The vertical axis of the swivel housing 38 corresponds with the vertical axis of the pinion shaft 34 so that the propeller assembly may be swiveled on its vertical axis without disengaging the mesh of ring gear 29 and pinion gear 33.

The lower pivot of the swiveled housing 38 comprises a bearing member 60 disposed about the pinion shaft 34 and being rotatably mounted on housing 37 by a suitable bearing 61, and held in place by lock nut 62. The bearing member 60 is secured to the shell 50 by bolts 63.

The upper pivot of the swiveled housing 38 comprises a pivot member 70 cast as an integral extension of the shell 50 and is rotatably secured to a basic frame member 71 of the plane 12 by means of a suitable bearing 72 and nut 73.

The pinion shaft 34 and the pivot member 70 may collectively be considered a spindle mounting for the propeller assembly.

The means for controlling the position of the propeller assembly and housing 38 comprises a segmental worm gear 75 having its radial center coincident with the vertical axis of the spindle, secured to an extension 76 of shell 50 by any suitable means such as bolts 77, and which meshes with a worm 78. The worm 78 is keyed to a shaft 79 which is securely mounted on the frame member 71 by a suitable clamp 80. The shaft 79 may be rotated by means of a pulley 79a (see Figure 1), a flexible endless cable 81 disposed over said pulley and over any necessary guide pulleys, and a hand operated crank pulley 82, or by any other convenient hand or power means.

Thus it will be seen that the pilot P may turn the crank pulley 82 which rotates the worm 78 and worm gear 75. Rotation of the worm gear 75 causes rotation of the swivel housing 38 and the entire propeller assembly.

It is contemplated that in the practice of the invention, gears will be cut out, shafts hollowed, and other designing carried out in accordance with recognized engineering practice to lighten weight.

For streamlining, it is desirable, though not necessary to my invention, to mount a cone 90 on the propeller hub 21. Instead of a cone, a cupped plate or other closure may be employed, or the hub may be left uncovered.

The primary use of the invention is pilot controlled variation of the propeller axis and consequently the direction of thrust. When employed as a pusher on a helicopter, the propeller may be shifted to exert a thrust opposing the torque of the rotor and thus maintain the longitudinal axis of the craft on the line of flight. It also serves as a means of propulsion in a standard helicopter, and as a directional control and propulsion means in an autogiro. Whether thus installed, or employed in other types of aircraft, the propeller may be mounted either fore or aft. In most cases, the conventional rudder may be dispensed with, although under some circumstances a rudder may be advantageously employed in conjunction with my directional propeller.

In order to accommodate the turning of the propeller axis, as indicated in dotted lines, Figure 2, it is necessary to provide turning space at the tail of the fuselage in some manner. A simple and convenient arrangement is to round the tail end of the fuselage, as indicated at 100 in Figure 2.

In Figure 5, I illustrate a modification which affords greater turning radius of the propeller axis. In this form, the propeller hub is spaced further from the pivot member 70' (the prime numerals representing corresponding parts given base numerals in the principal disclosure). This may be accomplished by lengthening the bearing member 25' and central sleeve 51'. A deeper cutback 100' is formed in the fuselage at the tail to accommodate the swinging of parts associated with the propeller.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent structures.

Having described my invention, what I claim as new and desire to secure by Letters Patent is:

1. In an aircraft a propeller assembly comprising: a hollow hub carrying blades and rotatably mounted on a hollow hub support, means on a frame element of said aircraft rotatably mounting said hub support for rotation on an axis at an angle to the axis of said hub, means to rotatably position said last named means, and a coupling for delivering motive power to said hub, said coupling comprising a ring gear fixed to said hub, a driving gear meshing with said ring gear said driving gear being mounted on an axis coincident with the axis of said first named means, and lubricant sealed means to deliver motive power to said driving gear.

2. In an aircraft a propeller assembly comprising: a hollow hub carrying blades and rotatably mounted on a hollow hub support, a spindle assembly carried on a frame element of said aircraft rotatably mounting said hub support for rotation on an axis at a right angle to the axis of said hub, a ring gear on said hub, a bearing for said ring gear on said spindle assembly, a gear having a lubricant sealed drive connection to a suitable external source of power and lubricant sealing means for said bearing on said assembly, means to rotatably position said spindle assembly, comprising a gear on said assembly, a worm meshing with said gear, and a pulley and cable control operatively connected with said worm to rotate the latter, and a coupling for delivering motive power to said hub.

3. In an aircraft a propeller assembly comprising: a hollow hub carrying blades and rotatably mounted on a hollow hub support, a spindle assembly carried on a frame element of said aircraft rotatably mounting said hub support for rotation on an axis at a right angle to the axis of said hub, a ring gear on said hub, a plurality of bearings for said ring gear on said spindle assembly, lubricant sealing means for each said bearing on said assembly including a retaining ring and a felt washer, upper and lower pivot connections between the assembly and the aircraft, means to rotatably position said spindle assembly, comprising a gear on the exterior of said assembly adjacent the upper pivot connection, a worm meshing with said gear, and a pulley and cable control operatively connected with said worm to rotate the latter, and a coupling for delivering motive power to said hub.

4. In an aircraft a propeller assembly comprising a hollow hub having radially extending blades clamped thereto, a shell having a substantially annular closed chamber therein suitable for the retention of a lubricating medium, a bearing member on the hub including a ring gear rotatably supported on the shell within the chamber and lubricant sealing means closing the junction of the hub with the shell, said shell having opposite upper and lower pivot connections cooperable with the aircraft, a swivel housing at the lower side of the shell having a closed chamber therein joining the annular chamber in the shell, a driving gear in said last chamber in engagement with the ring gear, a stationary housing providing a mount for the lower pivot connection on one end of a driving gear shaft, and rotating means respectively on the shell and the aircraft for shifting the axis of rotation of the propeller hub in a plane transverse to the axis of said pivot connections.

5. In an aircraft a propeller assembly comprising a hollow hub having radially extending blades clamped thereto, a shell having a substantially annular closed chamber therein suitable for the retention of a lubricating medium, a bearing member on the hub including a ring gear rotatably supported on the shell within the chamber and lubricant sealing means closing the junction of the hub with the shell, said shell having opposite upper and lower pivot connections cooperable with the aircraft, a swivel housing at the lower side of the shell having a closed chamber therein joining the annular chamber in the shell, a stationary housing providing a mount for the lower pivot connection, a vertical shaft extending through the lower pivot connection having a gear on the upper end in engagement with the ring gear and a bevel gear fixed at the lower end, a second bevel gear in said last chamber connected by a drive shaft to an exterior power supply and engaging said last bevel gear, and rotating means respectively on the shell and the aircraft for shifting the axis of rotation of the propeller hub in a horizontal plane.

6. In an aircraft a propeller assembly comprising a hollow hub having radially extending blades clamped thereto, a shell having a substantially annular closed chamber therein suitable for the retention of a lubricating medium, a bearing member on the hub including a ring gear rotatably supported on the shell within the chamber and lubricant sealing means closing the junction of the hub with the shell, said shell having opposite upper and lower pivot connections cooperable with the aircraft, a swivel housing at the lower side of the shell having a closed chamber therein joining the annular chamber in the shell, a stationary housing providing a mount for the lower pivot connection, said last housing having a closed chamber therein suitable for retention of a lubricant medium, said last chamber providing a lower portion and a cap in axial alignment with the pivot connections closing said lower portion, a vertical shaft extending through the lower pivot connection having a gear on the upper end in engagement with the ring gear and a bevel gear fixed at the lower end within said last chamber, a second bevel gear in said last chamber connected by a drive shaft to an exterior power supply and engaging said last bevel gear, and rotating means respectively on the shell and the aircraft for shifting the axis of rotation of the propeller hub in a horizontal plane.

DANIEL R. ZUCK.

REFERENCES CITED

The following references are of record in the file of this patent:

UNITED STATES PATENTS

| Number | Name | Date |
|---|---|---|
| 1,185,824 | Rice | June 6, 1916 |
| 1,788,430 | Hall | Jan. 13, 1931 |
| 1,868,975 | Hall | July 26, 1932 |
| 2,306,703 | Kost | Dec. 29, 1942 |
| 2,135,073 | Gerhardt et al. | Nov. 1, 1938 |
| 1,971,734 | Stalker | Aug. 28, 1934 |
| 2,130,918 | De Stefano | Sept. 20, 1938 |
| 2,357,742 | Jeffrey | Sept. 5, 1944 |

FOREIGN PATENTS

| Number | Country | Date |
|---|---|---|
| 811,394 | France | Jan. 14, 1937 |